(12) United States Patent
Vorbeck et al.

(10) Patent No.: US 8,184,978 B2
(45) Date of Patent: May 22, 2012

(54) METHOD AND DEVICE FOR CHANNEL-ADAPTED SIGNAL TRANSMISSION IN OPTICAL NETWORKS

(75) Inventors: Sascha Vorbeck, Griesheim (DE); Ralph Leppla, Darmstadt (DE); Malte Schneiders, Darmstadt (DE); Matthias Gunkel, Darmstadt (DE); Werner Weiershausen, Eppertshausen (DE)

(73) Assignee: Deutsche Telekom AG, Bonn (DE)

( * ) Notice: Subject to any disclaimer, the term of this patent is extended or adjusted under 35 U.S.C. 154(b) by 848 days.

(21) Appl. No.: 12/097,358

(22) PCT Filed: Dec. 8, 2006

(86) PCT No.: PCT/DE2006/002179
§ 371 (c)(1),
(2), (4) Date: Nov. 17, 2008

(87) PCT Pub. No.: WO2007/076767
PCT Pub. Date: Jul. 12, 2007

(65) Prior Publication Data
US 2009/0214212 A1    Aug. 27, 2009

(30) Foreign Application Priority Data

Dec. 16, 2005 (DE) .......................... 10 2005 060 256

(51) Int. Cl.
*H04J 14/02* (2006.01)
*H04B 10/12* (2006.01)
*H04B 10/04* (2006.01)

(52) U.S. Cl. ............................ 398/79; 398/147; 398/195

(58) Field of Classification Search ............... 398/79, 398/26–29, 81, 147, 83–85, 195–198
See application file for complete search history.

(56) References Cited

U.S. PATENT DOCUMENTS

| 6,441,934 | B1 | 8/2002 | Boord et al. |
| 6,580,531 | B1 * | 6/2003 | Swanson et al. ................ 398/5 |
| 2002/0154855 | A1 * | 10/2002 | Rose et al. ...................... 385/24 |
| 2003/0166394 | A1 * | 9/2003 | Tsien et al. .................. 455/67.1 |
| 2004/0037569 | A1 | 2/2004 | Kamalov et al. |
| 2004/0067057 | A1 * | 4/2004 | Akiyama et al. ............... 398/26 |
| 2004/0240042 | A1 | 12/2004 | Charlet et al. |

FOREIGN PATENT DOCUMENTS

| DE | 69904805 T2 | 11/2003 |
| EP | 1011218 | 6/2000 |
| WO | 02/071670 | 9/2002 |
| WO | 03/088542 | 10/2003 |

* cited by examiner

*Primary Examiner* — Dawayne A Pinkney
(74) *Attorney, Agent, or Firm* — Leydig, Voit & Mayer, Ltd.

(57) ABSTRACT

A method for optical data transmission in a wavelength multiplexing system having at least two transmission channels of different wavelengths includes determining at least one value which is a measure of a physical property of an optical data transmission path of the wavelength multiplexing system; and automatically adjusting a transmission parameter of at least one of the transmission channels as a function of the determined at least one value.

10 Claims, 5 Drawing Sheets

METHOD AND DEVICE FOR CHANNEL-ADAPTED SIGNAL TRANSMISSION IN OPTICAL NETWORKS

CROSS REFERENCE TO RELATED APPLICATIONS

This is a U.S. national phase application under 35 U.S.C. §371 of International Patent Application No. PCT/DE2006/002179, filed Dec. 8, 2006, and claims benefit of German Patent Application No. 10 2005 060 256.8, filed Dec. 16, 2005. The International Application was published in German on Jul. 12, 2007 as WO 2007/076767 A1 under PCT Article 21(2).

FIELD

The invention relates generally to optical data transmission systems and in particular to a wavelength multiplexing system and a method for optical data transmission in a system of this type.

BACKGROUND

In contemporary optical transmission networks, data is transmitted via optical channels with channel data rates of up to 40 Gbit/s. In order to increase the transmission capacity, not only one but a plurality of channels are transmitted on one glass fibre in the wavelength multiplex. From DE 699 04 805 T2, for example, there is known a wavelength multiplexing system which allows the multiplexing and demultiplexing of up to 32 wavelength channels in the preferred wavelength range of 1535-1565 nm (C-band), the channels being separated from one another by 0.4 nm. In contemporary 10 Gbit/s systems, up to 80 channels are transmitted in the C-band in part.

Transmitters for systems of this type, in the form of transmission lasers, are commercially available (as variable frequency) lasers, both with fixed wavelength and with variable wavelengths. The imprinting of data onto the transmission laser by modulation is achieved by means of external modulators after the creation of the optical wave. The data rate is thus determined only by the data rate of the signal supplied to the modulator (client signal) and a constructionally determined maximum data rate of the modulator, and is thus variable. As a rule, however, the data rates are fixed and are not varied. For separating the individual data channels in the receiver, optical filters, which transmit the desired channel and filter out all other channels, are used. The filters may, in accordance with the transmission lasers, either already be fixed to a wavelength during production or be configured so as to be variable. All transmission channels are fixed to a wavelength in the transmitter and maintain said wavelength up until the receiver. A wavelength conversion between the information source and sink does not occur.

The physical parameters of an optical transmission path vary over time. In general, optical transmission systems react to variations in the parameters of the transmission channel more sensitively at higher data rates. Some physical parameters of the transmission medium vary deterministically as a function of the external influences and can be predicted. Other parameters vary stochastically and thus cannot be determined by calculations beforehand. In this case, only the value range of the parameter may be determined, by means of measurements and the tools of stochastics. Deterministic and quasi-static variations can be incorporated into the planning process, in such a way that either a sufficiently great tolerance of the transmission system or tuned compensators are provided. With stochastic and rapid variations, the compensators must accordingly react rapidly and possibly have a large value range or adjustment range available. Both the requirement for fast reaction times and that for wide adjustment ranges lead to a substantial increase of costs in systems of this type. Thus, for example, appropriate PMD compensators are indeed technically feasible for the physical effect of polarization mode dispersion, but the actual use thereof is prevented by the lack of cost efficiency.

SUMMARY

In an embodiment, the present invention provides a method for optical data transmission in a wavelength multiplexing system having at least two transmission channels of different wavelengths. The method includes the steps of: determining at least one value which is a measure of a physical property of an optical data transmission path of the wavelength multiplexing system; and automatically adjusting a transmission parameter of at least one transmission channel of the two transmission channels as a function of the determined at least one value.

In another embodiment, the present invention provides a wavelength multiplexing system for optical data transmission having at least two transmission channels of different wavelengths. The system includes: a controllable transmitter configured to provide an optical signal, wherein the controllable transmitter is connected via an optical transmission path to a controllable receiver configured to receive the optical signal; a monitoring device configured to determine at least one value which is a measure of a physical property of the optical transmission path; and a control unit configured to control the controllable transmitter and the controllable receiver, wherein the control unit is connected to the controllable transmitter, the controllable receiver and the monitoring device.

BRIEF DESCRIPTION OF THE DRAWINGS

The invention is described in more detail below by means of preferred embodiments and with reference to the appended drawings. The same reference numbers refer to identical or similar components in the drawings, in which.

DETAILED DESCRIPTION

Figure 1:
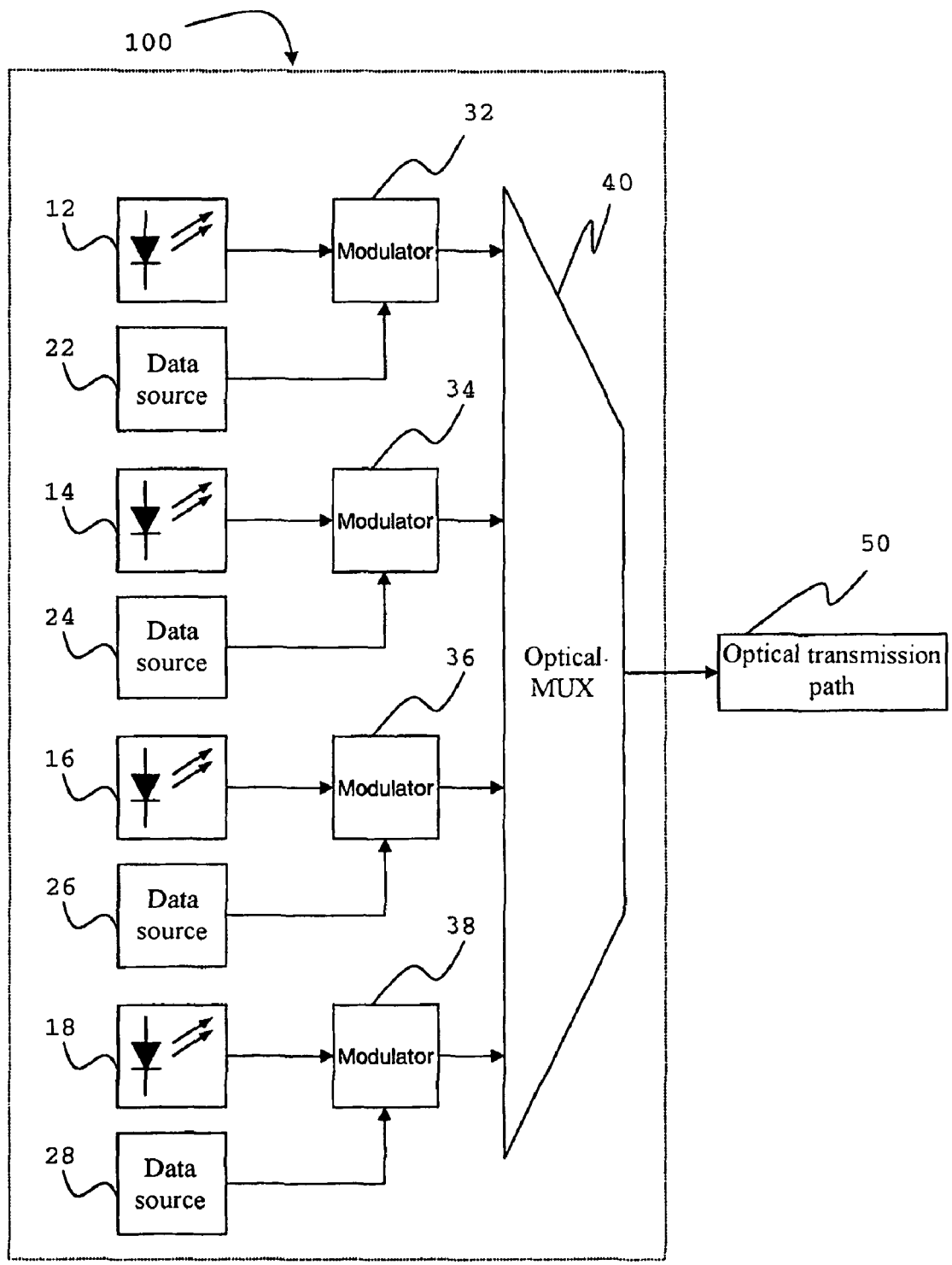
FIG. 1 is a schematic representation of a transmitter of a wavelength multiplexing system with four transmitter units in accordance with an embodiment of the invention.

By way of overview and introduction, an embodiment of the invention provides a way of increasing the transmission quality of a wavelength multiplexing system, in particular without adaptive compensation of stochastic variations of physical parameters of the optical transmission path. Moreover, an embodiment of the present invention provides an increase in the efficiency of the bandwidth utilisation of a wavelength multiplexing system.

Accordingly, a method embodying the invention for optical data transmission in a wavelength multiplexing system involves determining at least one value which is a measure of a physical property of the optical transmission path of the wave multiplexing system and automatically adjusting at least one transmission parameter of at least one transmission channel of the wavelength multiplexing system as a function of the determined value, the wavelength multiplexing system having at least two transmission channels of different wavelengths.

Advantageously, the wavelength multiplexing system comprises a plurality of transmission channels of different wavelengths within a pre-specified bandwidth. As was mentioned above, up to 80 transmission channels can be transmitted in the conventional C-band in the wavelength range of 1535-1565 nm in contemporary systems.

Various embodiments of the invention are based on the idea of a channel-adapted transmission. By means of determined parameters of the optical transmission path, in particular of the transmission medium, a parameter adaptation of the transmission channels takes place. Cost-intensive adaptive compensations of stochastically varying physical properties of the transmission medium thus become superfluous, or become more simply and inexpensively practicable because of lower requirements.

In accordance with the various embodiments of the invention, physical properties of the optical transmission path, which have an influence on the signal quality and thus on the transmission quality of the transmission channels, are considered. Accordingly, the determined value, which is a measure of a physical property of the optical transmission path, is also a measure of the signal quality or transmission quality of at least one transmission channel.

One possibility for guaranteeing constant high signal quality without adaptive compensation, despite the parameter variations of a transmission channel, includes adapting the transmitter and the receiver to the properties of the transmission channel. As can be shown by long-term measurements, the differential group delay (DGD), for example, of an optical transmission path is subject to stochastic variations because of varying environmental conditions. The DGD values, which lead only to slight degradation of the signal and can thus be tolerated, vary in inverse proportion to the data rate. Consequently, lower data rates can tolerate higher DGD values and higher data rates can tolerate lower DGD values. A similar relationship can also be seen, for example, for the optical signal to noise ratio (OSNR), the dispersion, the dispersion increase, and also for other parameters. If a data channel with a high data rate is now transmitted, at a wavelength which has a high DGD value at the moment of transmission, this will result in a very poor transmission quality.

A channel-adapted transmission in accordance with the invention can now guarantee a very high signal quality in that the wavelength of the transmission channel is altered until a wavelength which currently has a low DGD value is obtained. Accordingly, the automatic adjustment of the transmission parameters preferably comprises the adjustment of the wavelength of at least one transmission channel.

A variant of the channel-adapted transmission involves varying the data rate at a fixed wavelength. In this variant, the data rate of a channel is reduced until the signal quality is satisfactory once again. When the detrimental effects are reduced, the data rate is conversely increased. For this purpose, an adaptive receive filter is provided in accordance with the modulation format. Accordingly, the automatic adjustment of the transmission parameters advantageously comprises the adjustment of the data transmission rate of at least one transmission channel.

A corresponding result can also be obtained by altering the modulation format of a transmission channel, the altered modulation format being more robust against disturbance due to physical effects. Accordingly, the automatic adjustment of the transmission parameters further advantageously comprises the adjustment of the modulation format of at least one transmission channel.

Determining a value which is a measure of a physical property of the optical transmission path of the wavelength multiplexing system advantageously involves measuring a residual dispersion, a residual dispersion increase, a differential group delay (DGD) and/or an optical signal to noise ratio (OSNR) of the optical transmission path.

Because the physical properties of the optical transmission path have an effect on the signal quality and thus on the transmission quality of the transmission channels, determining a value which is a measure of a physical property of the optical transmission path further involves measuring a bit-error rate, a Q factor, the opening of an eye diagram and/or a degree of polarization.

In accordance with an embodiment of the invention, in the above example of the wavelength adaptation of a transmission channel as a function of the detected differential group delay, in the case where the available transmission bandwidth is already extremely full up with transmission channels, the channels with a lower data rate are transmitted at the wavelengths with the highest DGD values and the channels with a high data rate are transmitted at the wavelengths with low DGD values.

Accordingly, the method advantageously involves providing at least two data channels of pre-specified data rates, determining at least two values which are each a measure of the physical properties of the optical transmission path at the wavelength of at least two transmission channels, establishing the expected transmission quality of the at least two transmission channels as a function of the determined values, and assigning the data channels to the transmission channels with decreasing data rate of the data channels and decreasing transmission quality of the transmission channels, beginning with the data channel with the highest data rate and the transmission channel with the highest transmission quality, the physical property of the optical transmission path being dependent on the wavelength and the transmission quality of a transmission channel being determined by the physical property of the optical transmission path at the wavelength of the transmission channel. Especially advantageously, a plurality of data channels and a plurality of transmission channels are provided, the number of transmission channels being greater than or equal to the number of data channels. An equivalent effect can be achieved by varying the data rate and the modulation format. In particular by means of a combined variation of the wavelength, the data rate and/or the modulation format, an optimised signal quality over all transmission channels can be obtained. Furthermore, by adapting the spectral channel assignment in accordance with the invention, the efficiency of the bandwidth use is increased.

A wavelength multiplexing system for optical data transmission, having at least two transmission channels of different wavelengths, comprises a controllable transmitter for creating an optical signal, said transmitter being connected via an optical transmission path to a controllable receiver for receiving the optical signal, a monitoring device for determining at least one value which is a measure of a physical property of the optical transmission path and a control unit for controlling the transmitter and the receiver, said control unit being connected to the transmitter, the receiver and the monitoring device.

Accordingly, the transmitter and receiver are preferably configured for data transmission via at least two transmission channels of different wavelengths. Especially advantageously, the wavelengths, the data transmission rate and/or the modulation format of each transmission channel can be controlled separately via the control unit.

For this purpose, the transmitter advantageously comprises corresponding, separately controllable transmitter units for each transmission channel, each transmitter unit preferably having a transmission laser for creating an optical signal and a modulator for imprinting the data of a data channel. The transmitter units are in this case configured in such a way that the wavelength of the transmission laser, the modulation format of the modulator and/or the data transmission rate of the data channel can be varied automatically. Similarly, the receiver comprises corresponding, separately controllable receiving units for each transmission channel, each receiving unit comprising an optical filter, for selecting a wavelength, and a demodulator.

In order to decide whether a variation in the channel wavelength, the channel data rate or the modulation format of the channel will lead to an optimal transmission quality of all channels, it is particularly advantageous for the current values of the transmission medium and the current signal quality of the transmission channels both to be determined. In order to measure the property parameters of the transmission medium as a function of the wavelength, a fibre monitor is preferably provided. Various parameters, which can be monitored by a signal monitor, are suitable for assessing the signal quality.

Accordingly, the monitoring device advantageously comprises a fibre monitor for determining the residual dispersion, the residual dispersion increase, the differential group delay (DGD) and/or the optical signal to noise ratio (OSNR) of an optical fibre which is preferably used for the optical transmission path. The monitoring device further advantageously comprises a signal monitor for determining a bit-error rate, a Q factor, the opening of an eye diagram and/or a degree of polarization.

FIG. 1 shows schematically the basic construction of a transmitter 100 of a wavelength multiplexing system. In the embodiment shown, the transmitter 100 has four transmitter units, the transmitter units each comprising a transmission laser 12, 14, 16 and 18 respectively for creating an optical signal with a wavelength within a pre-specified bandwidth, for example within the C-band between 1535 and 1565 nm. In the state of the art, the transmission lasers 12, 14, 16 and 18 are set to be fixed to a wavelength before the data transmission begins, the wavelengths of the transmission lasers 12, 14, 16 and 18 each being different from one another. Further, the transmitter units each comprise a modulator 32, 34, 36 and 38 respectively for imprinting data, which are supplied at pre-specified data rates via data sources 22, 24, 26 and 28 respectively, onto the optical output signal of the respective transmission laser 12, 14, 16, and 18.

The modulated optical output signals of the modulators 32, 34, 36 and 38 are combined into an optical signal by means of an optical multiplexer 40 and transmitted to a receiver via the optical transmission path 50.

Because the physical properties of the optical data path 50 are not constant, but vary over time in cycles which are sometimes rapid, a channel-adapted transmission is carried out. FIG. 2a to 2d show different variants of the channel adaptation, which may take place individually for each transmission channel.

Figure 2A:
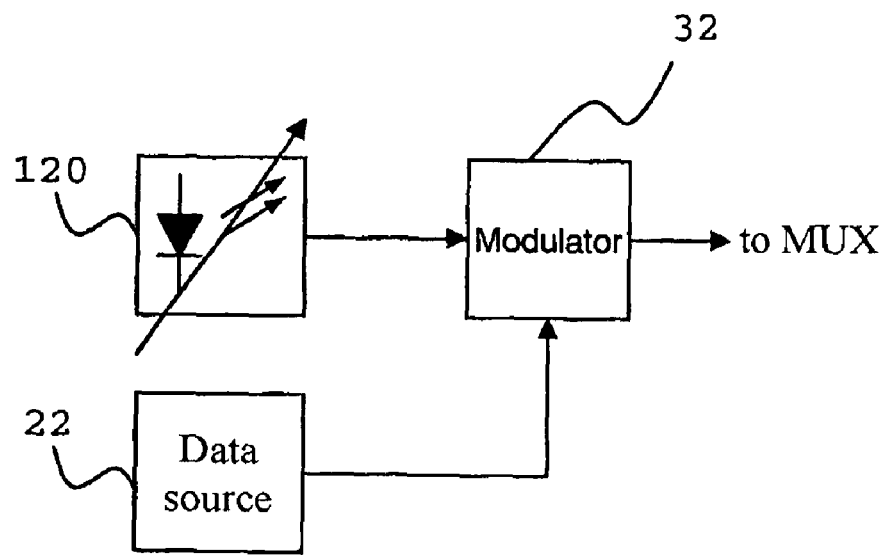
FIG. 2a is a schematic representation of an embodiment according to the invention of a transmitter unit with variable wavelength.
Figure 2B:
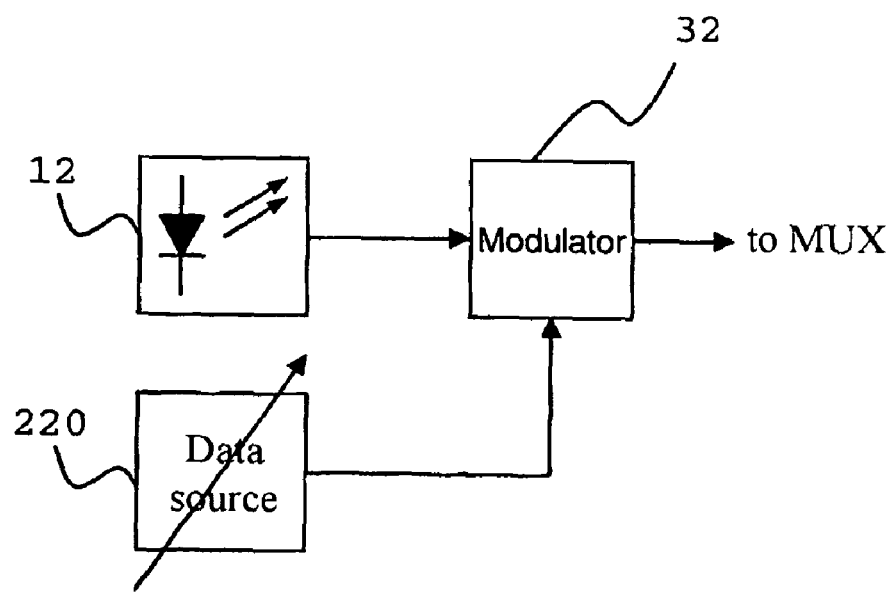
FIG. 2b is a schematic representation of an embodiment according to the invention of a transmitter unit with variable data rate.

For automatically varying the wavelength of a transmission channel, the transmission unit comprises an automatically adjustable transmission laser 120, as is shown in FIG. 2a. In another variant, the data rate of the transmission channel is adapted to the properties of the transmission path. For this purpose, the transmitter unit comprises a data source 220 with a correspondingly controllable data transmission rate. A channel adaptation according to the invention can also be achieved by varying the modulation format of the modulator, in a further variant. Depending on the intended use, the working environment and other edge parameters, the variation of the wavelength, the data rate and the modulation format may be combined in any desired manner in the channel adaptation according to the invention.

Figure 2C:
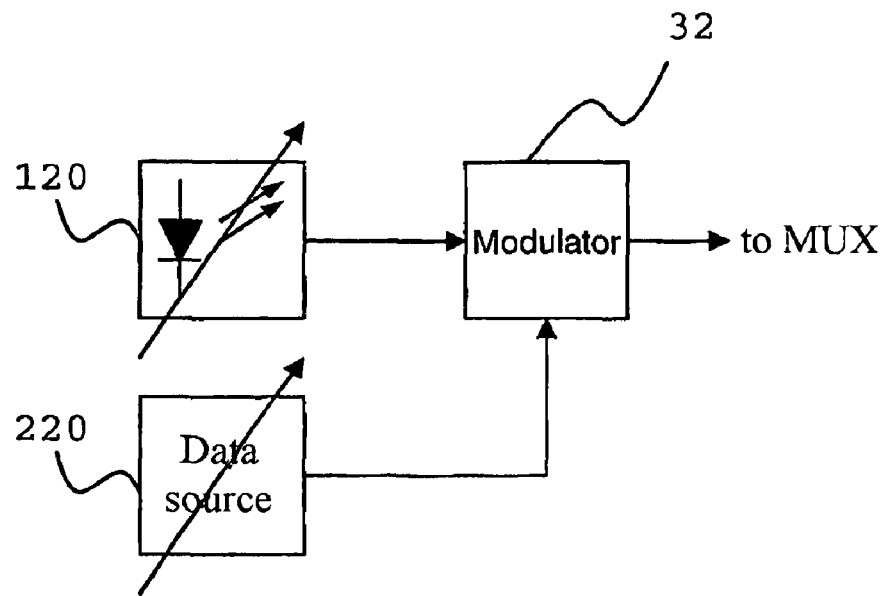
FIG. 2c is a schematic representation of an embodiment according to the invention of a transmitter unit with variable wavelength and variable data rate.
Figure 2D:
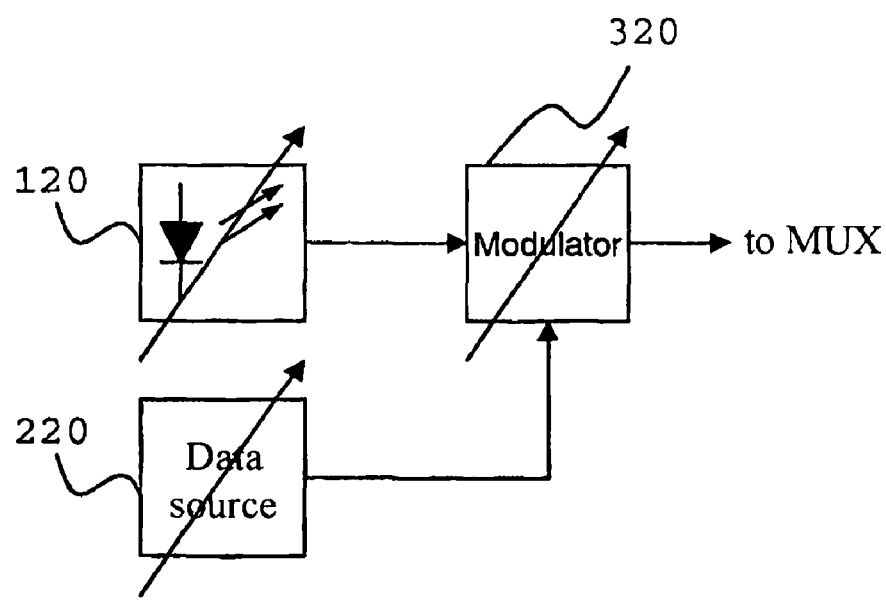
FIG. 2d is a schematic representation of an embodiment according to the invention of a transmitter unit with variable wavelength, variable data rate and variable modulation format.

FIG. 2c accordingly shows an embodiment in which both an adjustable transmitter laser 120 for varying the wavelength and a data source 220 with controllable data transmission rate are provided in the transmitter unit. In FIG. 2d, a controllable modulator 320, in which the modulation format to be used can be altered automatically, is additionally provided in the transmitter unit.

Figure 3:
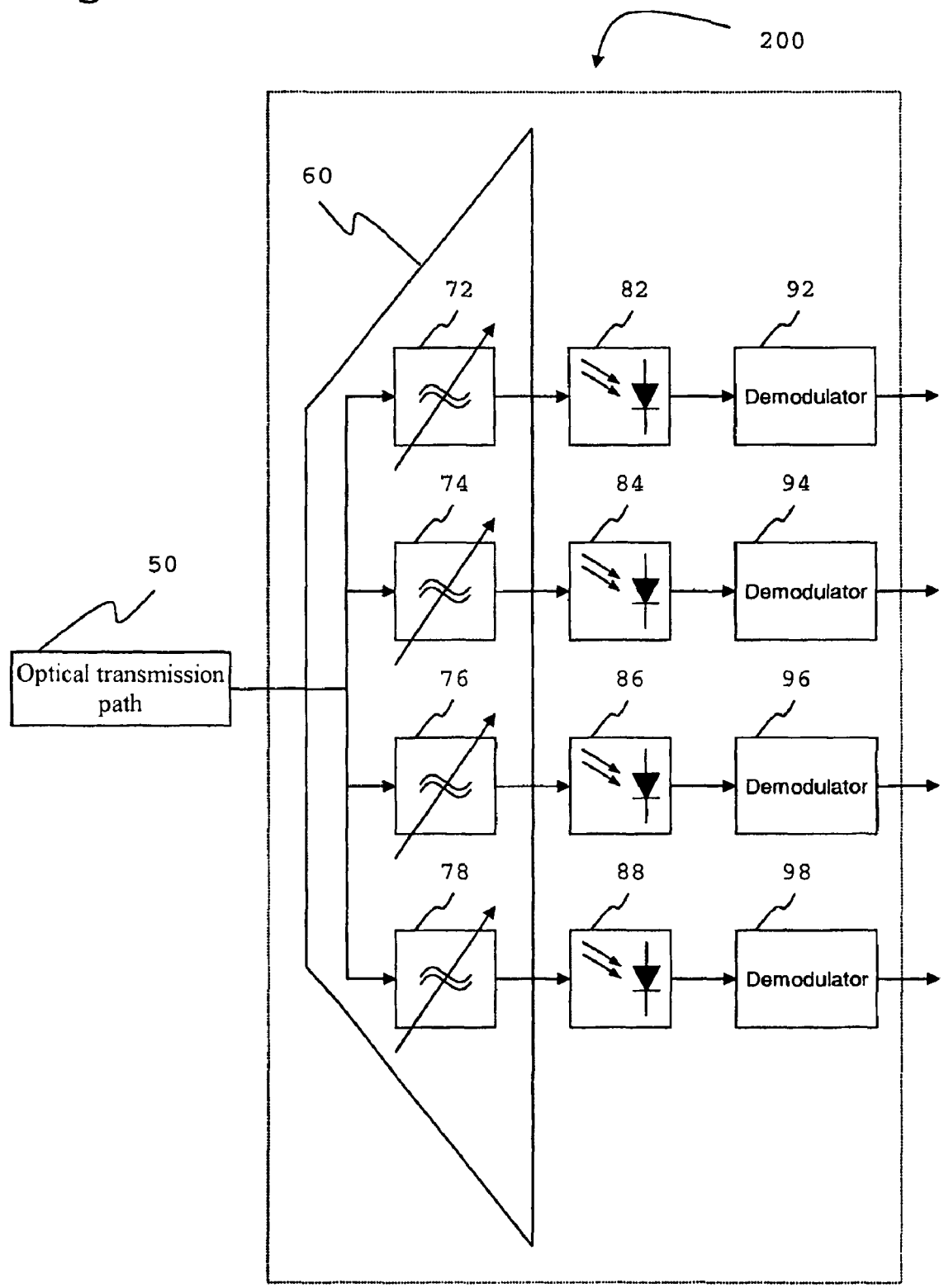
FIG. 3 is a schematic representation of an embodiment according to the invention of a receiver of a wavelength multiplexing system with four receiving units.

In order to receive a signal from a transmitter which has a channel adaptation according to the invention, a corresponding controllable receiver 200, as shown in FIG. 3, is provided. The receiver 200, which receives an optical signal via the optical transmission path 50, comprises an optical demultiplexer 60, which comprises an adjustable optical filter 72, 74, 76 and 78 respectively for each transmission channel. The depicted embodiment shows a corresponding receiver for a transmitter with transmitter units in accordance with FIG. 2c. Accordingly, the optical filters 72, 74, 76 and 78 respectively are automatically adjustable in such a way that in each case the wavelength adjusted at the respective controllable transmission laser 120 of the transmitter is selected. By means of optical sensors 82, 84, 86 and 88 respectively, the optical signals of the selected wavelengths are converted into electrical signals and demodulated by means of the demodulators 92, 94, 96 and 98 respectively. For the further transmitter variants described above, the corresponding components of the receiver, in particular the demodulators 92, 94, 96 and 98 are also constructed so as to be controllable.

By means of a channel-adapted transmission which embodies the invention, the signal quality may be optimised, for example, in the case of variations in the dispersion and the dispersion increase. The two parameters of dispersion and dispersion increase are subject to temperature-conditioned variations. Thus, the temperature changes of the ground are responsible for the parameter variations in the transmission fibres and the temperature variations in the operating locations of the network operator are responsible for the parameter variations of the dispersion-compensating fibres. Reduction in the signal degradation due to the variation in the dispersion is generally possible only by reducing the data rate. The dispersion increase leads to a wavelength-dependent dispersion parameter. Consequently, not all channels experience the same dispersion. When the dispersion increase varies, the wavelength dependency of the dispersion parameter varies as a result. By means of a wavelength-adaptive transmitter and receiver according to the invention, it is possible to place channels with a low dispersion tolerance in a wavelength range which has a low residual dispersion. A further optimisation possibility is offered by signal power and the signal to noise ratio (OSNR). Optical amplifiers do not exhibit constant amplification and noise accumulation over the whole wavelength range. Consequently, a wavelength-dependent OSNR is adapted throughout the transmission band. For a consistently high signal quality, channels with high data rates require a high OSNR. For channels with a lower data rate, a lower OSNR is still sufficient. Thus, the signal quality can be optimised by means of a channel-adapted transmitter and receiver in that either the channels with the high data rates are shifted into the regions with high OSNR, or the data rates are adapted to the OSNR value. The same result can also be achieved by altering the modulation format.

Figure 4:
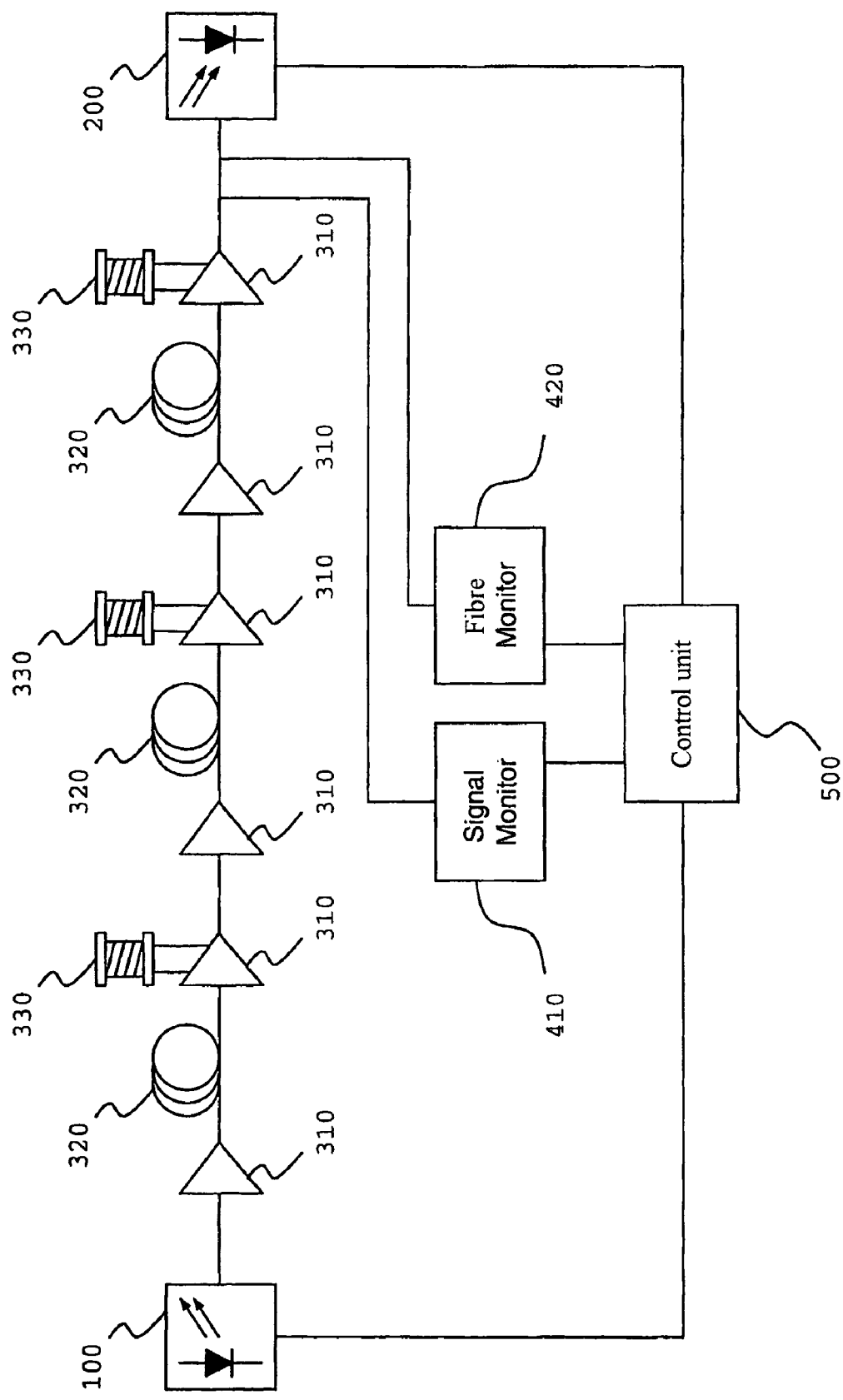
FIG. 4 is a schematic representation of an embodiment according to the invention of a wavelength multiplexing system.

FIG. 4 shows a wavelength multiplexing system in accordance with one embodiment of the invention having a controllable transmitter 100 and a controllable receiver 200, the transmitter 100 comprising controllable transmitter units such as are shown by way of example in FIG. 2a to 2d. The receiver 200 comprises corresponding receiving units.

The transmitter 100 and receiver 200 are connected to one another via an optical transmission path which, in the embodiment shown, comprises three segments, each of which has two amplifiers 310, a transmission fibre 320 which is arranged between the amplifiers 310, and one dispersion-compensating fibre 330 in each case.

The system further comprises a signal monitor 410 for monitoring the signal quality of the transmission channels, for example by measuring a bit-error rate, a Q factor, the opening of an eye diagram and/or a degree of polarization, and a fibre monitor 420 for measuring the parameters of the transmission medium, such as residual dispersion, residual dispersion increase, differential group delay (DGD) and/or optical signal to noise ratio (OSNR). In FIG. 4, signal and fibre monitors 410 and 420 act on the end of the transmission path. According to the embodiment of the invention, however, signal and fibre monitors 410 and 420 may act on any other point of the system.

By means of the measured values of the fibre and signal monitor, an intelligent controller in the form of the control unit 500 adapts the parameters of wavelength, data rate and/or modulation format of the transmission channels and monitors the improvement in the signal quality of the individual channels.

The disclosed wavelength multiplexing system in accordance with one embodiment of is a very flexible and also complex system. Accordingly, the control unit 500 advantageously comprises a microprocessor and a storage unit for storing the values measured by the signal and fibre monitors 410 and 420 and for providing an appropriate control program.

Thus, while there have been shown, described, and pointed out fundamental novel features of the invention as applied to several embodiments, it will be understood that various omissions, substitutions, and changes in the form and details of the illustrated embodiments, and in their operation, may be made by those skilled in the art without departing from the spirit and scope of the invention. Substitutions of elements from one embodiment to another are also fully intended and contemplated. The invention is defined solely with regard to the claims appended hereto, and equivalents of the recitations therein.

The invention claimed is:

1. A method for optical data transmission in a wavelength multiplexing system having at least two transmission channels of different wavelengths, the method comprising the steps of:

determining at least one value which is a measure of a physical property of an optical data transmission path of the wavelength multiplexing system; and automatically adjusting a transmission parameter of at least one transmission channel of the transmission channels as a function of the determined at least one value so as to improve transmission quality for the at least one transmission channel;

wherein the at least two transmission channels are combined by an optical multiplexer and transmitted to a receiver via the optical data transmission path and wherein each transmission channel corresponds to at least one transmission laser, at least one data source, and at least one modulator; and wherein the automatically adjusting step includes at least one of:

adjusting a wavelength corresponding to a transmission laser;

adjusting a data transmission rate corresponding to a data source; and adjusting a modulation format corresponding to a modulator.

2. The method according to claim 1, wherein the determined at least one value is a measure of a transmission quality of the at least one transmission channel.

3. The method according to claim 1, wherein the determining step includes measuring at least one of a residual dispersion, a residual dispersion increase, a differential group delay (DGD), and an optical signal to noise ratio (OSNR) of the optical transmission path.

4. The method according to claim 1, wherein the determining step includes measuring at least one of a bit-error rate, a Q factor, an opening of an eye diagram, and a degree of polarization.

5. The method according to claim 1, wherein the physical property of the optical data transmission path is wavelength-dependent and a transmission quality of the at least one transmission channel is determined by the physical property at a wavelength of the at least one transmission channel, the method further comprising:

providing at least two data channels having a pre-specified data rate;

determining at least two values which are each a measure of the physical property of the optical data transmission path at the wavelength of the at least two transmission channels;

determining an expected transmission quality of the at least two transmission channels as a function of the at least two determined values; and assigning the provided data channels to the at least two transmission channels so as to create a correspondence between the data channel with a highest pre-specified data rate and the transmission channel with the highest transmission quality, and continuing with data channels having a decreasing pre-specified data rate and the transmission channels having a decreasing transmission quality.

6. The method according to claim 5, wherein a number of the transmission channels is greater than or equal to a number of the data channels.

7. A wavelength multiplexing system for optical data transmission having at least two transmission channels of different wavelengths, comprising:

a controllable transmitter configured to provide an optical signal, wherein the controllable transmitter is connected via an optical transmission path to a controllable receiver configured to receive the optical signal and the controllable transmitter includes:

an optical multiplexer configured to combine the at least two transmission channels for transmission to a receiver via an optical data transmission path;

the at least two transmission channels; and at least one transmission unit corresponding to each transmission channel, wherein each transmission unit comprises at least one transmission laser, at least one data source, and at least one modulator, wherein at least one of a wavelength corresponding to a transmission laser, a data transmission rate corresponding to a data source, and a modulation format corresponding to a modulator is adjustable;

a monitoring device configured to determine at least one value which is a measure of a physical property of the optical transmission path; and a control unit configured to control the controllable transmitter and the controllable receiver, wherein the control unit is connected to the controllable transmitter, the controllable receiver and the monitoring device.

8. The system according to claim 7, wherein the optical transmission path has an optical fiber and the monitoring device includes an optical fiber monitor configured to determine at least one of a residual dispersion, a residual dispersion increase, a differential group delay, and an optical signal to noise ratio of the optical fiber.

9. The system according to claim 7, wherein the monitoring device includes a signal monitor configured to determine at least one of a bit-error rate, a Q factor, an opening of an eye diagram, and a degree of polarization.

10. The system according to claim 7, wherein the control unit includes a microprocessor and a storage unit.

* * * * *